(No Model.)

J. F. STEWARD.
HARVESTER REEL.

No. 401,665. Patented Apr. 16, 1889.

Witnesses:
Arthur Johnson.
Fred. A. Evans.

Inventor:
John F. Steward.

UNITED STATES PATENT OFFICE.

JOHN F. STEWARD, OF CHICAGO, ILLINOIS.

HARVESTER-REEL.

SPECIFICATION forming part of Letters Patent No. 401,665, dated April 16, 1889.

Application filed September 29, 1888. Serial No. 286,724. (No model.)

*To all whom it may concern:*

Be it known that I, JOHN F. STEWARD, of Chicago, in the county of Cook and State of Illinois, have invented certain new and useful Improvements in Harvester-Reel Sustaining and Driving Mechanism, of which the following is a full description, reference being had to the accompanying drawings, in which—

Figure 1:
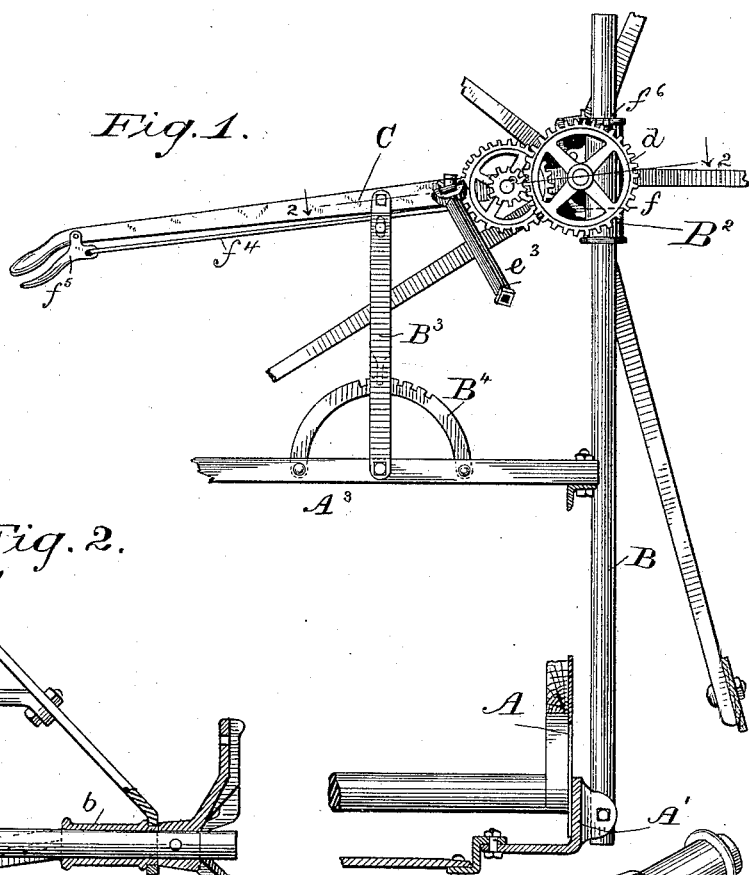
Figure 2:
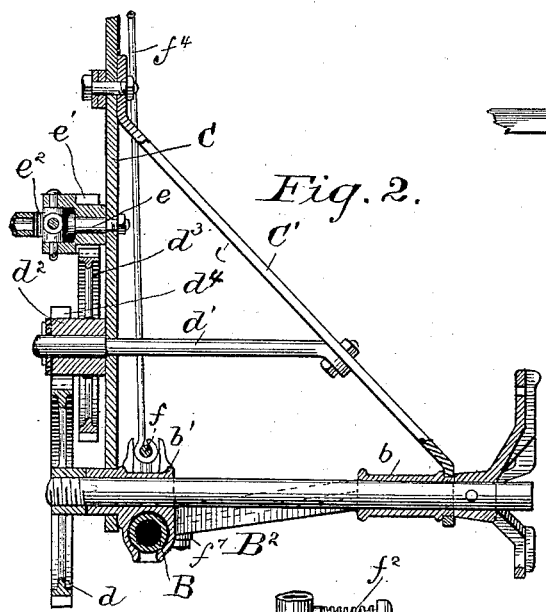
Figure 3:
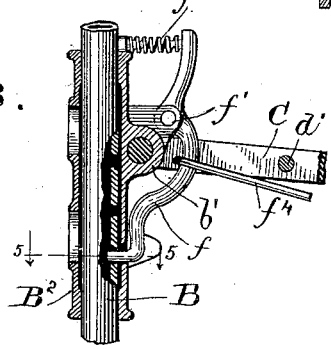
Figure 4:
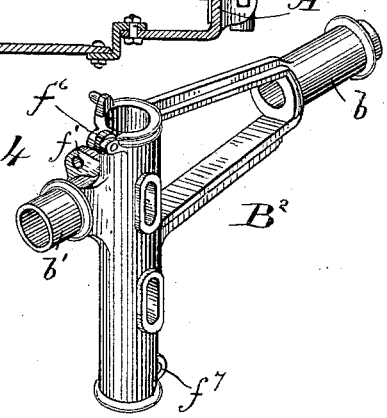
Figure 5:
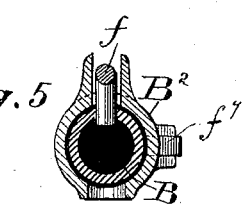

Figure 1 is a stubble-side elevation; Fig. 2, a sectional plan view on line 2 2, Fig. 1; Fig. 3, a grain-side sectional view of the reel-shaft-bearing bracket and adjacent parts; Fig. 4, a perspective view of the said bracket, and Fig. 5, a horizontal section of a portion of said bracket and its sustaining-pawl and the supporting-post.

My invention relates to a particular combination and arrangement of an adjustable reel-suporting lever and driving-gears thereon to permit the connection of the driving-shaft in rear of the reel-shaft, and connections with a pawl for sustaining the bracket on the reel-post. I find this construction and arrangement particularly desirable in harvesting-machines in which the reel is rotated from the uppermost elevator-shaft. It is common to connect the reel-shaft itself, through slip-shafts having universal joints, to the forward end of said elevator-shaft by means of suitable beveled gears or screws and worm-wheels secured thereto. In Letters Patent No. 391,095, issued to me on the 16th day of October, 1888, I have shown such an arrangement, except that the slip-shaft does not connect directly to the reel-shaft, but is nevertheless geared thereto by an arrangement wherein the end of the slip-shaft is directly in line with the reel-shaft. An objection has been found to all such arrangements, because when the reel is moved to its foremost position of adjustment, unless the slip-shaft is very long, the two parts thereof are pulled asunder or the angle of the joints becomes so great as to produce an irregularity during each rotation of the shafts in the rate of speed, giving a jerky movement, oftentimes very great. This objection is greater when the reel-shaft is but a little distance from the end of the drum-shaft from which it is driven, principally because the forward adjustment of the reel is to a point so far in advance of the gearing upon the drum-shaft.

In arranging the gearing as I have shown and will describe I am able to connect the slip-shaft at a point so far rearward that the forward adjustment of the reel will not carry it so far as to cause great angularity of the said shaft in extreme adjustments.

In the drawings, A is the lower portion of the front elevator-frame of the harvester, and A' is the shoe of the same.

$A^3$ is the seat-board.

B is the reel-post upon which the reel-bracket $B^2$ is adapted to rise and fall, and forms a support for the weight of the reel.

Upon the seat-board I pivot a swinging fulcrum, $B^3$, and provide a fixed notched sector-plate, $B^4$, to receive a locking-dog on the fulcrum-post $B^3$. Any suitable means may be provided to operate this dog. Such parts are well known in the art in this connection, and, being foreign to the present invention, need no description herein. Upon the top of the fulcrum $B^3$, I pivot the reel-lever C. From a point near the said fulcrum I extend the brace C' diagonally forward and grainward. The reel-bracket $B^2$, I extend grainward, and provide a journal-bearing, $b$, for the reel-shaft, and upon the vertically-tubular portion I provide another journal-bearing, $b'$. The construction of the bracket last mentioned will be clearly understood by referring to Fig. 4. The members C and C', which are, strictly speaking, the lever and a brace fastened to its side, have eyes upon their ends, so as to surround the bearings $b$ and $b'$ of the reel-shaft. Rollers $f^6 f^7$ are mounted in the bracket to ride against opposite sides of the reel-post and reduce the friction between the parts; but these are not necessary features of my construction.

Upon the stubble end of the reel-shaft is keyed the gear $d$, and upon the stud $d'$ is mounted the double gear-wheel $d^2$, having the gear or pinion $d^3$ and gear $d^4$ cast as one piece. The stud $d'$ is preferably passed through a hole formed in the lever C and bolted to the brace C', as shown in Fig. 2.

Upon a stud-bolt, $e$, secured to the reel-lever C, is the pinion $e'$, having lugs adapted to receive the universal joint $e^2$. This universal joint is connected to a driving-shaft, $e^3$, which in the form shown is of tubular construction and square form adapted to receive a slip-shaft, of any of the common forms of construction, for imparting motion through the intermediate gearing to the reel.

The reel-post B, I preferably make of gas-pipe, and provide it with holes to receive the operative end of the pawl or latch $f$, connected by pivot $f'$ to the reel-bracket, and having at its upper end the spring $f^2$, resting between it and the reel-bracket for the purpose of pressing the said pawl into engagement. From a point immediately below the pivot $f'$ the pawl $f$ is made cylindrical in section, and bent, so as to be concentric with the axis of the reel-shaft.

It will be observed, by referring to Fig. 3, that if the reel-bracket is raised or lowered and the angle of the reel-lever relative to the same thus changed, the latch-rod $f^4$, which is loosely hooked around the pawl, will be permitted to slide around on the curved portion of the said pawl, and whatever the angles of the two parts referred to the latch-rod $f^4$ will always be in line with the reel-shaft, the result of this being that the latch-lever $f^5$ will always retain the proper relative position to the handle of the lever C. If the latch-rod were not permitted to slide around on the pawl, the position of the latch-lever $f^5$ would change, and while it would sometimes be out of reach of the fingers of the hand, at other times it would be so much closer as to be, in effect, too short to withdraw the pawl from engagement with the reel-post.

I am aware that reels operated by chains have been constructed, in which a sprocket-wheel is mounted on the reel-shaft and another one mounted upon an axis coincident with the fulcrum of the reel-lever. This form is not adapted to be driven from the forward end of the upper elevator-shaft because of the necessarily great angle of the jointed slip-shaft.

What I claim as my invention, and desire to secure by Letters Patent, is—

1. The reel-post and the sliding reel-sustaining bracket thereon, in combination with the adjusting-lever pivoted to the bracket, the pawl pivoted to the bracket at a point eccentric to the lever-pivot and curved in a line substantially concentric with said lever-pivot, and the latch-controlling rod mounted on the lever and arranged to slide on the curved portion of the pawl, whereby said rod is enabled to adjust itself to suit the variable angle between the lever and bracket.

2. The reel-post, the sliding bracket thereon, and the reel-shaft mounted in said bracket and provided with the driving-gear, in combination with a bracket-adjusting lever pivoted thereto concentric with the reel-shaft, and a driving-gear mounted on said lever and engaging the gear on the reel-shaft, whereby the lever is enabled to sustain the driving-gear and to adjust the reel without disturbing the operative relation of said gears.

3. The reel-post and the sliding bracket thereon, the reel-shaft mounted in the bracket and provided with the gear $d$, the adjusting-lever pivoted to the bracket concentric to the reel-shaft, the concentric gears $d^2$ and $d^3$, mounted on the lever in rear of the reel-post, the pinion $E'$, also mounted on the lever, the universal joint connected to said pinion, and the driving-shaft connected to said joint, whereby the driving-shaft is permitted to stand in rear of the reel-shaft, as and for the purposes described, and the adjustment of the reel permitted without disturbing the operative relation of the gears.

JOHN F. STEWARD.

Witnesses:
ARTHUR JOHNSON,
JOHN A. STONE.